United States Patent [19]

Nitschke et al.

[11] Patent Number: 4,864,202
[45] Date of Patent: Sep. 5, 1989

[54] METHOD AND APPARATUS FOR MONITORING THE OPERATION OF A COMPUTER-CONTROLLED OPERATING ELEMENT, PARTICULARLY TRIGGERED SAFETY APPARATUS FOR AN AUTOMOTIVE VEHICLE

[75] Inventors: Werner Nitschke, Ditzingen; Hugo Weller, Oberriexingen; Wolfgang Drobny, Besigheim; Peter Taufer, Renningen; Edmund Jeenicke, Schwieberdingen, all of Fed. Rep. of Germany

[73] Assignee: Robert Bosch GmbH, Stuttgart, Fed. Rep. of Germany

[21] Appl. No.: 107,379

[22] Filed: Oct. 9, 1987

[30] Foreign Application Priority Data

Nov. 14, 1986 [DE] Fed. Rep. of Germany ....... 3639065

[51] Int. Cl.[4] .................. G05B 9/02; G05B 23/02
[52] U.S. Cl. .................... 318/560; 318/563; 318/565; 307/10.1; 280/735
[58] Field of Search ............ 318/560, 563, 565; 180/197, 271; 280/728, 734, 735, 801, 802; 303/92, 95; 307/9, 10 R, 105 B; 340/52 R, 52 E, 61; 342/71, 72; 364/424, 426

[56] References Cited

U.S. PATENT DOCUMENTS

| 4,059,822 | 11/1977 | Toshioka et al. | 342/72 X |
| 4,359,715 | 11/1982 | Langer et al. | 340/52 R |
| 4,672,223 | 6/1987 | Badge et al. | 307/9 X |
| 4,674,049 | 6/1987 | Kubo | 303/95 X |
| 4,700,304 | 10/1987 | Byrne et al. | 303/92 X |
| 4,701,854 | 10/1987 | Matsuda | 303/92 X |
| 4,745,542 | 5/1988 | Baba et al. | 303/92 X |

FOREIGN PATENT DOCUMENTS

0787206 12/1980 U.S.S.R. ................. 307/9

Primary Examiner—Bentsu Ro
Attorney, Agent, or Firm—Frishauf, Holtz, Goodman & Woodward

[57] ABSTRACT

To prevent spurious operation of a controlled operating element (12), typically a safety element which can be irreversibly triggered, such as a trigger or firing cartridge of a passenger restraint airbag, while providing for reliable operation in case of a crash of a vehicle in which the airbag is installed, a control signal is derived from a computer (10) processing input signals. The transmission of the control signals from the computer (10) to the operating element (12) is through a time delay stage (30) which has a time delay of sufficient length to permit the computer to correct, if necessary, signals from its output (16) and to carry out tests on the output signals from the computer apparatus. An evaluation circuit (18) continuously compares the output signals with check values. The check values may be derived from, for example a second computer similar to the computer, or from stored representative values. If the comparison indicates coincidence, the operating control signal from the computer is transmitted to the operating element (12). If, however, e.g. due to extraneous disturbances, a deviation between the test samples and the signals derived from the output (16) of the computer indicates a deviation, transmission of the control signals from the computer (10) to the operating element (12) is prevented, and the computer is controlled to repeat its computation, or part of a computation cycle.

23 Claims, 2 Drawing Sheets

METHOD AND APPARATUS FOR MONITORING THE OPERATION OF A COMPUTER-CONTROLLED OPERATING ELEMENT, PARTICULARLY TRIGGERED SAFETY APPARATUS FOR AN AUTOMOTIVE VEHICLE

Reference to related applications, assigned to the Assignee of the present application, the disclosure of which is hereby incorporated by reference:

U.S. application Ser. No. 107,382, filed Oct. 9, 1987 Werner Nitschke, Hugo Weller, Wolfgang Drobny and Peter Taufer.

U.S. application Ser. No. 107,386, filed Oct. 19, 1987 Werner Nitschke, Hugo Weller, Wolfgang Drobny and Peter Taufer.

The present invention relates to a method to monitor the operation of an operating element which is triggered to an operating function by a computer apparatus, and to apparatus carrying out the method and controlling the operating element, and more particularly for incorporation in a multi-computer system supervising and controlling safety apparatus, especially safety apparatus in automotive vehicles, such as a brake antilock system, an airbag, a safety belt tensioning or tightening system, or the like. The invention is applicable, in general, to all types of computer controlled operating systems in which reliability of carrying out a computer command is of utmost importance, for example for safety reasons, while reliably preventing operation of the operating element if a danger situation does not exist to avoid false or erroneous operation of the operating element which, under conditions of normal functioning of other apparatus might cause dangerous conditions to arise.

BACKGROUND

Many types of operating elements, positioning elements and the like are used in control and positioning technology. Optical or acoustic signal transducers are used to provide optical or acoustic warning or danger signals; also, analog instruments are employed, in which dangerous zones are specially marked or colored.

Process control computers are increasingly used in order to control complex and rapidly proceeding operating steps. Process computers are capable of processing a substantial quantity of data from which operating signals are to be derived. Process computers, particularly when installed in vehicles and subject to randomly occurring stray signals are, however, subject to malfunction. Typically, process computers whether installed in a fixed location or in a moving vehicle, are subject to interference due to stray sparking, arcing, radio and other communication signals, electric discharges, and interferences due to switching pulses occurring on power lines and which are coupled to the computer apparatus through stray coupling inductances or capacities. Thus, monitoring of the operation of the computer system or network is necessary.

The well-known arrangements to monitor operation of computer apparatus are not always sufficient when the computer is to control safety equipment. This can be demonstrated as an example using a passive passenger restraint system in an automotive vehicle, for example an airbag.

In an airbag passenger restraint system, passengers are to be protected against collision with interior components of the vehicle upon collision of the vehicle with an obstruction, which may be another vehicle. Airbags are triggered in that, shortly after the vehicle experiences a collision, an electrically ignited gas cartridge emits, rapidly, gas into the airbag to be placed between the passengers and the interior components of the vehicle.

Airbag protective systems, or other systems are triggered by continuously sensing acceleration and deceleration of the vehicle and processing the sensed information. When the vehicle hits an obstruction, these values can be represented as a curve having minima and maxima, respectively, well-known as a crash curve. The triggered instant for the gas cartridge, or for locking a belt restraint system or for some other system, then must occur at a precise instant of time which can be determnined by experiments. The requirement of reliable response of the restraint system is, however, equally important as the reliable protection of erroneous, or inadverent triggering. Otherwise, if an airbag would suddenly explode under normal operation, the visibility of the roadway, for driving, would be impaired; the surprise trigger might, additionally, cause the driver to react such that an accident might occur merely because the airbag or restraint system has operated without any reason therefor.

Monitoring systems as generally used and known are not capable to prevent an erroneous triggering. In the same instant in which, in case of malfunction, an erroneous triggering would be indicated, it would be too late to prevent firing of the gas cartridge; it would have been, irreversibily, fired and the gas filling of the airbag could no longer be prevented.

The foregoing is merely an example; there are many instances, also in the field of machine tools and the like, chemical and other processes which are not concerned with safety as such, where malfunction which simulates, or indicates a specific condition, could cause extensive damage.

THE INVENTION

It is an object to provide a method and a system to monitor operating elements which are controlled by computer apparatus in which, in case of malfunction or interference or disturbances, such disturbance conditions can be sensed in time in advance of providing an output signal which would cause a predetermined operation of the operating element—for example triggering of a gas-emitting cartridge of an airbag—so that erroneous operating commands will not be executed by the operating element. Specifically, it is an object to provide a system to monitor computer-controlled operating elements in which, in case of disturbance, the output of operating commands can be recognized and thus erroneous commands for operating elements will not be propagated.

Briefly, the computer apparatus provides output signals on output terminals; the output signals are sampled, so that signal samples are derived, and evaluated, for example in an evaluation circuit. The signal samples are continuously compared, within predetermined time intervals, with check, or test, or command values. If the comparison between the check values and the signal samples indicates coincidence, the output signal from the computer apparatus is transmitted to the operating element, for example an electrical trigger element for a gas cartridge of an airbag, that is, to control the output element to carry out its predetermined operation. if, however, the comparison between the check or test or command values and the signal samples indicates a deviation, transmission of the control signal to the operating element is prevented, for example by being blocked or inhibited; further, the computer apparatus unit is then controlled to correct its output, for example by resetting the computer apparatus to start computing again from an initial point, or from an intermediate program point.

The system and apparatus has the advantage that the signal samples are continuously compared with test values. Thus, the information regarding the correctness of the data processed by the process computer is continuously checked. Correction of the results tested, or suppression of erroneous control signals due to false computation is thus available at the earliest possible time.

The operating element, which is controlled by the control signal, generated by the process computer based on the data to be processed, is not immediately controlled to respond; there is a slight time delay. The result of a test is always awaited. Only after the test has been carried out, that is, after a comparison has been made between check data and the computed data, a decision is arrived at which determines if correction is needed or if the control signal can be used, without change, to control the operating element. If there is a deviation, the control signal is not utilized to control the operating element; rather, a further computation cycle is awaited. If, however, there is coincidence between the test data and the computed data, the operating element can be immediately controlled to respond as soon as this decision of coincidence is available.

A reliable protection against transmission of erroneous operating signals is thus provided, based on the assumption that upon testing signal samples, deviation from test or command or check data can be determined.

The operating element is controlled to respond with a slight delay if the output from the computer apparatus is correct, that is, is checked and tested against the test data and found to be correct. This, however, is usually not of significance in actual sysrtems since the mechanical response of the operating element is slow with respect to the electronic computation speed. By continuously updating information regarding the correctness of the computations carried out by the process computer, the delay can still be held to be very small, and, further, can be so calculated and dimensioned by suitable circuits and programming that the operating function of an operating element controlled by the computer apparatus is not impaired.

In accordance with a feature of the invention, an evaluation circuit is provided which is used for continuous comparison of output signal samples with check or test values. The evaluation circuit includes a comparator which receives signal samples from the output of the computer apparatus as well as test or check values from a check value file, or memory. The check value file can obtain its check values from the same data which are available to the process computer; or based on intermediate computational results, or of predetermined fixed probability relationships with respect to the output signal samples.

If the output signal samples deviate from the test data, a control signal source or generator is energized which provides, at the output of the evaluation circuit, a correction signal, or a release signal or a reset signal. These signals are applied to the process computer and, if desired, to a time delay stage. A time delay stage is preferably provided between the output of the process computer and the input of the operating element. It is used to provide control signals to the operating element only after it is determined that there is coincidence between the signal samples and the test values, as determined in the evaluation stage.

The circuit arrangement has the advantage of ensuring reliable prevention of erroneous operating commands with minimum delay in the signal transfer to the operating element. The arrangement permits continuously updating information regarding the correctness of results computed by the computer and to correct results computed by the computer at the fastest possible time and as soon as detected, so that unnecessary reserve times need not be provided.

DETAILED DESCRIPTION

Figure 1:
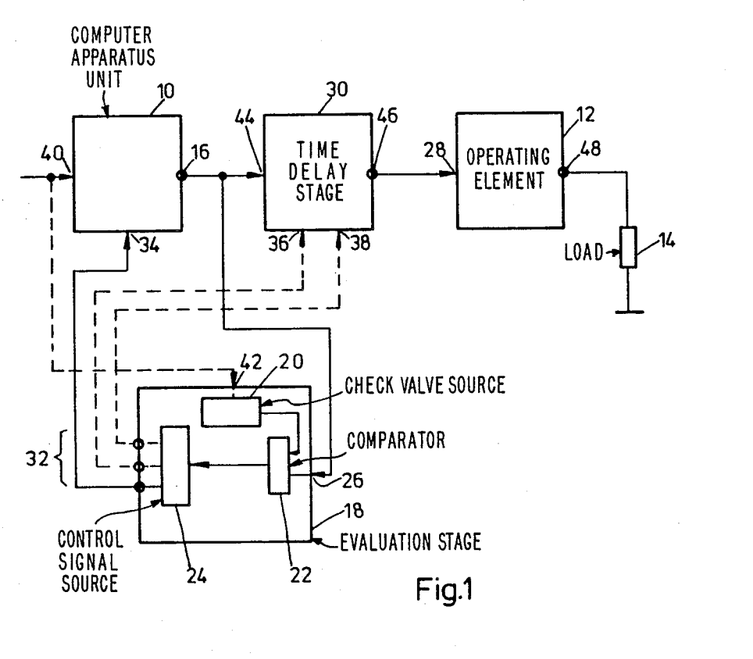
FIG. 1 is a general block circuit diagram of a computer controlled operating element and of an evaluation circuit and a time delay stage, all in accordance with the present invention and used to explain the method in accordance with the present invention.

The system, basically, includes a computer apparatus unit 10, an operating element 12, an evaluation circuit or stage 18 and a time delay stage 30.

The operating element 12, for purposes of illustration, is an airbag system. An inflatable gas or airbag is placed between passengers and portions of the vehicle. The airbag is inflated by trigering ignition of gas cartridges, to rapidly inflate the bag and place a pneumatic cushion between passengers of the vehicle and vehicle components. The load of the operating element 12, as shown in the drawing, is schematically represented by a resistor 14 which may form the internal resistance of the firing unit for the airbag.

The process computer 10 receives data over a data input terminal 40. Computer apparatus 10 has an output terminal 16 which is coupled with an input 44 of the time delay stage 30 and with an input 26 of the evaluation stage 18. The output 46 of the time delay stage 30 is coupled to input 28 of the operating element 12. The output 48 of the operating element 12 is connected to the load 14. Computer 10 processes crash curve data.

The input 26 of a evaluation stage 18 is connected, internally of the evaluation stage, to a comparator 22. Comparator 22 receives test data from a test data generator 20 in addition to the outputs from the computer apparatus unit 10. The comparator provides a comparison output which, internally of the evaluation stage, is connected to a control signal source or generator 24. The control signal generator 24 generates control signals which are connected via an output bus 32, which can be a multi-channel cable to a correction control input 34 of the computer apparatus 10 and, if desired, to a release input 36 of the time delay stage 30 and/or to a reset input 38 of the time delay stage 30.

The check or test value source 20 receives, if desired, signals over a test value input 42 which is coupled to the same data input line as the data input 40 of the computer apparatus 10.

In accordance with a preferred feature of the invention, the evaluation circuit or stage 18 can be formed by a further process computer. FIG. 1 illustrates the evaluation stage in form of components; if, however, the evaluation stage is to be constructed in form of a further process computer, for example a microcomputer element, the functions of the respective blocks 20,22 and 24 can be carried out by suitable programming steps, as well known in the field of programming of microcomputers, once the desired functions are determined.

The time delay stage 30 may be formed of a plurality of elements. For example, the time delay stage 30 can be a write-read memory, a shift register, a delay line, or a comparator with an integrator and a command or control signal source. If the time delay stage 30 is a write-read memory, both control inputs 36,38 are necessary. If the time delay stage is a shift register, or a delay line, only the reset input 38 is needed; if the time delay stage is a combination integrator and command value unit, no control input to the time delay stage will be needed. Since the time delay stage may take various forms, the respective connecting lines to the inputs 36,38 are shown in broken lines, to be used as needed based on the construction of the time delay stage.

OPERATION

In normal operation of the system, the computer apparatus 10 continuously receives data via the data input terminal 40. The computer apparatus 10 processes the data continuously, and provides data to the operating element 12. If the data received by the computer apparatus are indicative of a collision, the data supplied to the operating element 12 will control the operating element 12 to fire the gas releasing cartridge for the airbag. Before the data are applied to the operating element 12, however, the control signal is applied to the input 44 of the time delay stage 30, where the signal is, first, stored. At the same time that the signal is applied to the time delay stage 30, it is also applied to the input 26 of the evaluation stage 18. The comparator 22 compares the data signal at input 26 with a test value derived from the test or check value source 20.

In accordance with a feature of the invention, the test value source 20 can be a computer apparatus which carries out the same computations done in the computer apparatus unit 10. If the check value source 20 is of this kind, data are applied through the input terminal 42 to the check value source 20.

In accordance with another feature of the invention, the check value source 20 may have fixed values stored therein, based on plausibility characteristics, for comparison with the signal applied to input 26. If this embodiment is selected, the connection from input terminal 40 to line 42 is not needed and, therefore, this line has been shown in broken lines.

Reverting back to the operation of the system: the comparator 22 determines coincidence of signals at terminal 26 and derived from the check value source 20. If coincidence is determined, the control signal source 24 provides a "release" signal to the "release" input 36 of the time delay stage 30. If the time delay stage 30 is a write-read memory, such a signal is necessary to permit transmission of the control signal from input terminal 44 of the time delay stage 30 to the input terminal 28 of the operating element 12, for carrying out the respective operating command.

If the time delay stage 30 is a shift register, or a delay line, or an integrator and command source, no release signal is necessary. The control signal, rather, passes through the time delay circuit in its ordinary course, while the evaluation stage 18 determines coincidence of the signal samples with the check values from source 20. The time delay of the delay stage 30 is then so determined that it is at least as long as the time necessary for checking, that is, carrying out the comparison and, if necessary, correction. After the test has been made, the control signal is then automatically applied to the input 28 of the operating element 12.

If, and assuming that the time delay circuit 30 is a shift register or a delay line, deviation between the signal samples and the check or test value is determined, a correction signal is applied by the control signal source 20 at the output bus 32, for example in form of a reset command, applied to the correction control input 34 of the computer apparatus 10. This automatically cancels the signal at the output 16 of the computer apparatus 10 and, on the assumption that the time delay stage 30 is a shift register or a delay line, a reset signal is also connected to the reset input 38 thereof. Thus, the signal will never reach output terminal 46 of stage 30, of the operating element 12 is reliably suppressed before it could respond.

If the time delay circhuit 30 is a comparator with a command value source and an integrator, then it is sufficient to merely cancel or disable the control signal at the output 16 of the computer apparatus whereupon any output from the time delay stage will disappear, and time delayed control of the input 28 of the operating element is prevented.

Figure 2:
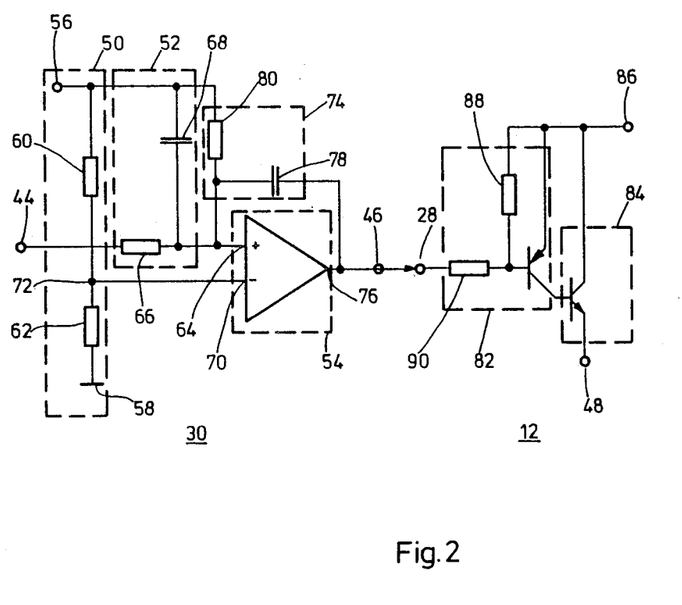
FIG. 2 is a detailed block circuit diagram of the time delay stage and a detailed diagram of an operating element illustrated as a vehicle passenger restraint system.

FIG. 2 illustrates an example of a preferred time delay circuit for stage 30 and of an operating element 12, for use in a vehicular passenger restraint system.

The time delay stage 30—see FIG. 2—has a reference or command signal source 50, an integrator 52, a comparator 54 and a differentiator 74.

The reference source 50 includes a voltage divider formed by resistor 60,62, connected between a reference voltage source 56 and reference potential, for example ground or chassis schematically shown at 58. A tap point 72 provides the reference voltage, which is applied to the inverting input 70 of an operational amplifier, which forms the comparator 54. The integrator 52 has a low-pass filter formed by resistor 66 and a capacitor 68. Capacitor 68 is connected to the reference potential 56. A junction point between resistor 66 and capacitor 68 is connected to the direct input of the operational amplifier of comparator 54.

The differentiator 74 is a high-pass circuit formed by a capacitor 78, connected between the output of the operational amplifier and its direct input 64. The direct input 64 of the operational amplifier is additionally connected to the junction between the capacitor 78 and a resistor 80, the other terminal of which is connected to reference potential 56.

The operating element 12 includes an emitter follower transistor 84 having its collector connected to a source of supply 86, and its emitter connected to the output terminal 48. The base of the emitter follower 84 is connected to the collector of a driver stage 82. The emitter of the driver is connected to the supply circuit 86. The base is coupled over a resistor 88 to the supply source 86. A coupling resistor 90 couples the base of the driver transistor of the driver stage 82 to the input 28 of the operating element.

OPERATION

Let it be assumed that a control signal in form of a voltage jump or pulse is applied to the input 44 of the time delay stage 30. The capacitor 68 is charged over the resistor 66. Depending on the time constant of the resistor-capacitor combination, the direct input 64 of the operational amplifier will receive a voltage which corresponds to the voltage at the tap point 72 of the voltage divider formed by resistors 60,62. As soon as this level is reached, the voltage at the output 76 of the operational amplifier 54 will change, thus providing an output at the terminal 46 of the time delay circuit 30. The output of the operational amplifier 54, which includes an output transistor, is formed as an open-collector circuit. Before an output is derived from the operational amplifier of comparator stage 54, thus, the driver transistor of the driver stage 82 will be so connected that the voltage at the base of the driver transistor 82 corresponds to the voltage of the supply circuit 86, by coupling through the resistor 88.

An output from the operational amplifier of stage 54 provides a control signal to the resistor 90 which switches the driver 82 to conduction, which causes conduction of the emitter-follower 84.

Capacitor 78 of the differentiator 74 connects the same voltage to the direct input 64 as that which is at the output terminal 76 of the operatinal amplifier. This feedback accelerates the switching time of the operational amplifier. Resistor 80 is so dimensioned that, after switchover, the second control signal will continue to be generated for a certain period of time, even if the first control signal changes due to special conditions.

If the control signal at the input 44, however, changes before the integral thereof has reached the reference level derived from the tap point 72 and connected to the inverting input, the operational amplifier will never switch over and thus its output voltage will not change. Consequently, generation of the second control signal which actually controls the operating element 12 is suppressed, and thus triggering, for example of an airbag by an output from terminal 48 is reliably inhibited.

The reliability of testing by comparing signal samples, which may be continuous signal samples from the computer apparatus 10 (FIG. 1) with reference or test or check signals depends on the way the reference signals are derived. Highest reliability is obtained when the entire data processing system, and data processing which occurs in a computer apparatus unit 10 is carried out twice, for example in a second computer apparatus. The probability that external interferences lead to identical errors which later on compensate each other is very small. Additionally, deviation can be immediately determined and the time delay of the delay stage 30 to control the operating element 12 can be very short. This, however, requires two identical computer apparatus units.

Less hardware requirement still provides good testing and checking, by, for example, checking signal samples with reference or check values based on intermediate results. In this case, however, the time gaps between test cycles become longer, thus increasing the delay between generation of an output signal and actual triggering of the operating element 12.

The simples test is checking signal samples by test values which depend on plausibility with respect to static signals.

The time for carrying out the computation cycle to process the data applied to terminal 40 until a result is obtained may be small with respect to a maximum permissible delay time to control the operating element. If that is the case, the test can be carried out merely based on the final result, and repeated for each computation cycle.

In accordance with a feature of the invention, the control signal which controls the operating element 12 is buffer-stored and, after the test and correction time interval has elapsed, transmitted to the operating element 12 if coincidence between test signals and the reference or check values agree. Such a method permits any desired control of the delay time. It also permits to match different test and correction times, from case to case, and to thereby set the delay time of the time delay stage to the shortest possible time interval. Independent of the delayed time, the control signals remain undisturbed and are transmitted from the computer apparatus unit 10, if the test and output agree.

In accordance with a modification of this method, the control signals which are used to control the operating elements are transmitted to the operating element during a coursing, or transmission time which corresponds at least to the time required to carry out checking and correction; upon deviation of the signal samples from the check values, they are immediately suppressed. This alternative provides the possibility to transmit the control signals directly, without modification or change, or intervention and thus with high precision, while only time delaying the signals. Such an arrangement requires fewer control commands.

In accordance with another modification of the present invention, and as explained above in connection with FIG. 2, a first control signal is generated in form of a voltage jump, which is integrated, and the interval contiguously compared with a reference value, derived from the tap point 72 (FIG. 2). When the reference value is reached, a second control signal in form of a voltage jump or pulse is generated and connected directly to the positioning element 12. The potential jump or the first voltage jump or signal is not transmitted, that is, is suppressed before the integral reaches the reference value if the second control signal is not to be transmitted, in other words, if the comparator 22 (FIG. 1) detected a discrepancy or deviation between the output signal from the coputer apparatus 10 and the check value source 20.

The various method steps can be easily instrumented with minimum hardware, or additional programming steps. If the time delay interval of the delay stage 30 is small, which is readily obtainable due to the high computation speed of current process computers, any predetermined delay interval by the time delay stage 30 can be accurately maintained. With respect to the various alternatives, the method which is described in detail in connection with FIG. 2 has the advantage that no control line or connection is needed to influence the time delay stage 30. It is only necessary to cancel, or inhibit the potential jump of the first control signal, applied for example to terminal 44 (FIG. 2). It is highly desirable to reduce the number of connecting lines, that is, both the numbers of data as well as control lines, since connection lines are most subject to malfunction. Thus, the embodiment described in detail in FIG. 2 is particularly insensitive with respect to disturbances or malfunction.

In accordance with another feature of the invention, and utilizing well-known and commercially available components, the time delay stage 30 is a write-read memory. The output of the evaluation stage 18 is then connected to the correction control input 34 of the computer apparatus 10 and, additionally, to the "release" and "reset" inputs of the memory.

This embodiment permits any applicable control of the length of the delay time, so that it can be matched, differently, for different test and correction time intervals. The control signals derived from the computer apparatus 10 are transmitted to the operating element 12 directly, and without intermediate processing and reconstitution.

In accordance with another feature of the invention, the time delay stage 30 is a shift register. Then, the output of the evaluation circuit 18 is connected to the correction input 34 of the computer apparatus 10 and, additionally, to the reset input 38 of the shift register. In this modification, also, the control signals transmitted from the computer apparatus unit 10 from output 16 are the original signals and not adulterated. The delay time can be easily controlled by precise clock control of the shift register. By use of frequency dividers, step-wise change of the delay time can be easily obtained. Control is simple, and a "release and transmit" terminal, such as terminal 36 is not needed.

Alternatively, and in accordance with another feature of the invention, the time delay stage may be a delay line; the output of the evaluation stage 18 is connected to the computer apparatus correction terminal 34 as well as to the reset input of the delay line, which can, again, be the terminal 38.

With short delay times, the control signals from the computer apparatus 10 remain practically unadulterated, and time delay periods can be precisely maintained. It is not possible, however, to control the delay time without additional circuitry or processes. Control is simplified, since the "release" terminal 36, and hence the connection line from the evaluation stage 18 thereto is not needed. The reset connection is used in order to suppress an undesired control signal which has reached the end of the delay line, for example upon determination of non-coincidence of data from the check value source 20 and the input terminal 26 of the comparator 22. Suppression of such a control signal can be easily obtained, for example by opening of a switch between the output of the delay line and the input 28 of the operating element.

The circuit requirements of the embodiment of FIG. 2 are particularly small, thus permitting physical construction of the circuit in a minimum space, which can be a substantial factor for many fields of application. Since only a minimum number of components are needed, the probability of failure likewise is low. This is particularly important when the operating elements are needed to provide safety, or safety related functions.

Short delay times, which are usually sufficient for process computers, can readily obtain by the alternative solution described in detail in connection with FIG. 2, since sufficient accuracy for the required time delay is obtained thereby. This is derived from the time constants of the differentiator in combination with the reference value and the level of the control signal which is applied to input terminal 44. The arrangement of FIG. 2 has the particular advantage that no special control line from the evaluation circuit 18 is required. It is only necessary to deenergize or disconnect the control signal at terminal 44, or to suppress the input signal before the integral of the control signal has reached a reference value of the reference signal source, that is, the value at junction 72 (FIG. 2).

The arrangement shown in FIG. 2, in which the reference potential is derived from a voltage divider formed by the resistor 60,62, and connected to a reference voltage source 56,58, is particularly suitable, since then the integrator can be constructed simply by a low-pass filter circuit including the resistor 66 and capacitor 68. The actual comparison between the reference signal voltage from terminal 72 of the voltage divider and the incoming signal preferred in a comparison element is an operational amplifier.

The arrangement of the reference voltage generator 50, as described, permits utilization of already present reference voltage sources. The arrangement of the integrator permits utilization of the steepest range between reference value and actual value in response to the sudden jump of a voltage curve based on a level change. Thus, a precise delay time can be readily controlled since the output from the operational amplifier will be a sharp pulse.

Utilization of an operational amplifier as a comparator permits high amplification with low loading of the external circuit elements. A clearly defined binary control system is available, with two clearly defined levels as soon as the integral of the first control signal from terminal 44 has teached the level of the reference voltage at the tap or junction point 72 of the voltage divider formed by the reference source 50.

Operational amplifiers of the preferred type utilize an output circuit which includes a transistor with an open collector. This arrangement permits ready coupling of the time delay stage 30 to th subsequent opeating element 12. As long as the integral of the control signal at terminal 44, that is the first control signal, has not yet reached the level of the reference value 72, the voltage at the output terminal 46 of the time delay stage will have the value of the quiescent or OFF-voltage of the subsequent input 28 of the operating element 12. This ensures that the subsequent operating element 12 is not energized to an undefined intermediate value, but, rather, also provides sharply defined binary output signals.

The comparator-operational amplifier of comparator element 54 preferably includes the differentiating circuit 74, to form a positive feedback. This positive feedback ensures complete switching of the operational amplifier as soon as the switching threshold of the two comparison inputs are reached, and thereby providing an unambiguous second control signal at terminal 46 to the input terminal 28 of the operating element 12. Bounce of signals, similar to the connctions with mechanical contacts which may have short time ON/OFF conditions due to terminal bounce, is reliably prevented in this manner.

Preferably, the differentiator 74 includes the capacitor 78, connected betwen the output 76 of the operational amplifier and the direct input 64 thereof, as well as a resistor 80, coupled to the reference voltage source 56. The second control signal, that is the outputs from the comparator 54, will then continue to control the input 28 of the operating element 12 even if in the meanwhile elements of the process control computer are not longer operative. This might occur, for example, if the process control computer has been damaged by a crash or collision; the operating element, as well as the time delay stage, can be secured within the vehicle to a position remote from an expected impact position, at a protected location, so that even if the more sensitive process control computer has already been damaged, continuous output signals to control the operating element will be available.

In a preferred embodiment, and forming a practical application, the operating element includes a complementary driver stage coupled to an emitter-follower transistor, as shown in FIG. 2.

The operating element 12, as shown in FIG. 2, is designed to control low resistance loads, such as a low resistance value resistor 14 (FIG. 1). Such a circuit structure, used in a driver stage, requires only few electronic components which further contribute to possible miniaturization as well as to reliability of the overall system since, the fewer components which are being used, the fewer the chance for any individual malfunction.

We claim:

1. Method of monitoring a computer system wherein the system includes
    a computer apparatus unit (10) having an output terminal (16) and
    a controlled operating element (12) coupled to the output terminal (16) of the computer apparatus unit,
    said computer apparatus unit (10) providing a control signal at the output terminal (16) for propagation of the control signal to the operating element (12) and for controlling the operating element to carry out a predetermined operation, and
    wherein, additionally, the output terminal (16) of the computer apparatus unit is subject to disturbance signals which, if propagated to the operating element (12) cause undesired operation of the operating element,
    comprising, in accordance with the invention, the steps of
    delaying propagation of the control signal from the computer apparatus unit (10) to the operating element (12) for a predetermined time interval;
    deriving signal samples from the output terminal (16) of the computer apparatus unit (10);
    evaluating said signal samples;
    comparing said signal samples continuously within said predetermined time interval with check of test values and, if the comparison between said check or test values and the signal samples
        (a) indicates coincidence, transmitting, after said time interval, said control signal to the operating element (12) to carry out the predetermined operation;
        (b) indicates a deviation, preventing, before elapse of said time interval, transmission of the control signal to the operating element and controlling the computer apparatus unit to repeat its computation.

2. The method of claim 1, wherein the step of delaying propagation of the control signal from the computer apparatus unit (10) includes the step of buffer-storing said control signal.

3. The method of claim 1, wherein th step of delaying propagation of the control signal between its appearance at the output of the computer apparatus unit (10) and reception by the operating element (12) comprising delaying the control signal for a perid of time corresponding at least to a test and correction time interval sufficient for testing and repeating the computation.

4. The method of claim 3, wherein the control signal has the form of a voltage jump or pulse;
    and wherein the steps of evaluating said signal samples and comparing said signal samples comprise integrating the control signal continuously and comparing the integrated value continuously with a reference or check value;
    and, if the reference value or check value is reached, generating a derived control signal in form of a voltage jump or pulse and transmitting said derived control signal to the operating element; if the comparison indictes a deviation, terminating or suppressing said evaluating and comparing steps before the integration has reached said reference or check value to thereby prevent generation of the derived control signal.

5. A system to monitor disturbances in a computer system and to inhibit effects of the disturbances,
    said computer system having
    a computer apparatus unit (10) having an output terminal (16);
    a controlled operating element (12) coupled to the output terminal,
    said computer apparatus unit providing an operating control signal at the output terminal (16) for preparation of the operating control signal to the controlled operating element (12) for controlling the operating element to carry out a predetermined operation, and
    wherein, additionally, the output terminal (16) of the computer apparatus unit is subject to disturbance signals which, if propagated to the operating element, cause undesired operation of the element (12),
    comprising, in accordance with the invention,
    an evaluation stage or circuit (18) coupled to the output terminal (16) of the computer apparatus unit (10),
    said evaluation stage or circuit including means (20) for providing test or check signals;
    a comparator (22) receiving signal samples from the output terminal (16) of the computer apparatus unit and said test or check signals and effecting comparison;
    and a control signal source (24) coupled to receive the output from the comparator (22) and responding to the comparator output indicative of
        (a) coincidence of the signal samples and the test or check signals,
        (b) a deviation between the signal samples and the test or check signals;
    said control signal source providing control signals of differing characteristics in dependence on the output from the comparator (22) in accordance with the comparison therein;
    a time delay stage (30) coupled between the output terminal (16) of the computer apparatus unit (10) and an input terminal (28) of the operating element (12);
    a correction terminal (34) on the computer apparatus unit (10) and controlling the computer apparatus unit to repeat at least one of: a computation; a computation cycle; a computation step;
    and coupling means (32) connected to receive the control signals from the control signal source and connected to the correction terminal (34) of the computer apparatus unit (10) to cause the computer apparatus unit to correct its computation if a deviation has been detected and for providing output signals inhibiting transmission of the operating control signal from the computer apparatus unit (10) through the time delay stage (30) to the operating element (12) if such a deviation has been detected by the comparator.

6. The system of claim 5, wherein the time delay stage (30) comprises a read-write memory;
and the control signal source (24) includes a connection connected to a "release" input (36) and a "reset" input (38) of the write-read memory (30), for, respectively, either releasing transmission of the operating control signal from the computer apparatus unit (10) to the operating element (12) if the comparison condition (a) is met, or to reset the read-write memory (30) if the comparison condition (b) is met.

7. The system of claim 5, wherein the time delay stage (30) comprises a shift register;
and wherein the output of the control signal source (24) is connected to a reset input (36) of the shift register for resetting the shift register if the comparison condition (b) is detected by the comparator (22).

8. The system according to claim 5, wherein the time delay stage (30) comprises a delay line, and the output of the control signal source (24) is connected to a reset input (38) of the delay line to reset the delay line if the comparison condition (b) is detected in the comparator (22).

9. The system according to claim 5, wherein the time delay stage (30) comprises a reference signal source (50), an integrator (52) and a comparator element (54) coupled to receive the operating control signal from the computer apparatus unit (10) and a reference signal from the reference signal source (50);
and wherein the evaluation stage or circuit controls the correction terminal (34) of the computer apparatus unit (10) to inhibit transmission of a control signal therefrom to the integrator if the comparison condition (b) is determined by the comparator (22).

10. The system according to claim 9, wherein the reference signal source (50) comprises a voltage divider connected between a reference voltage source;
the integrator comprises a low-pass filter comprising a resistor and a capacitor (68) connected to the output terminal (16) of the computer apparatus unit (10), the capacitor being coupled to one terminal of the reference signal source;
and wherein said comparator element (54) comprises an operational amplifier (54) having its direct input connected to the output of the low-pass filter (52) and the inverting input (70) connected to receive the reference signal of the reference signal source.

11. The system according to claim 10, wherein the operational amplifier has an open collector output terminal (76).

12. The system according to claim 10, including a differentiating network (74) coupled between the output of the operational amplifier and its direct input terminal to provide a positive feedback and to provide a holding voltage at the direct input terminal after the operating control signal has exceeded said reference signal and the operational amplifier has switched state.

13. The system according to claim 12, wherein the differentiating network (74) comprises a capacitor (78) coupled to the output of the operational amplifier and to the direct input thereof;
and a resistor (80) coupled to the direct input of the operational amplifier and to said reference voltage signal source.

14. The system according to claim 5, wherein the operating element (12) comprises an emitter-follower transistor circuit and a complementary driver stage (82) coupled to a transistor of the emitter-follower transistor circuit.

15. A method of monitoring a computer system, wherein the computer system includes
a computer apparatus unit (10) having an output terminal (16) and a controlled operating element (12), which controlled operating element comprises
safety apparatus in an automotive vehicle including at least one of:
a brake antilock system;
a passenger restraint system,
wherein the passenger restraint system comprises at least one of:
an air bag,
a safety belt tightening system,
a safety belt locking system,
said method including the steps of
providing an operating control signal at the output terminal (16) of the computer apparatus unit (10);
propagating the operating control signal to the operating element (12) for controlling the operating element to carry out a predetermined operation, and
wherein, additionally, the operating terminal (16) of the computer apparatus unit is subject to disturbance signals which, if propagated to the operating element, cause undesired operation of the operating element (12),
comprising, in accordance with the invention, the steps of
delaying propagation of the operating control signal from the computer apparatus unit (10) to the operating element (12) for a predetermined time interval;
deriving signal samples from the output terminal (16) of the computer apparatus unit (10);
evaluating said signal samples;
comparing said signal samples continuously within said predetermined time interval with check or test values and, if the comparison between said check or test values and the signal samples
(a) indicates concidence, transmitting, after said time interval, said operating control signal to the operating element (12) to carry out the predetermined operation;
(b) indicates a deviation, preventing, before elapse of said time interval, transmission of the operating control signal to the operating element and controlling the computer apparatus unit to repeat its computation.

16. The method of claim 15, wherein the step of delaying propagation includes the step of buffer-storing said operating control signal.

17. The method of claim 15, wherein the step of delaying propagation of the operating control signal between its appearance at the output of the computer apparatus unit (10) and reception by the operating element (12) comprising delaying the signal for a period of time corresponding at least to a test and correction time interval sufficient for testing and repeating the computation.

18. The method of claim 17, wherein th operating control signal has the form of a voltage jump or pulse;
and wherein the steps of evaluating said signal samples and comparing said signal samples comprise integrating the control signal continuously and comparing the integrated value continuously with a reference or check value;

and, if the reference value or check value is reached, generating a derived control signal in form of a voltage jump or pulse and transmitting said derived control signal to the operating element; if the comparison indicates a deviation, terminating or suppressing said evaluating and comparing steps before the integration has reached said reference or check value to thereby prevent generation of the derived control signal.

19. In an automotive vehicle having a safety system including an operating element (12) comprising at least one of:

a brake antilock system, a passenger restraint system, wherein the passenger restraint system comprises at least one of:

an air bag, a safety belt tightening system, a safety belt locking system, said safety system including a computer apparatus unit (10) having an output terminal (16);

the controlled operating element (12) being coupled to the output terminal (16), said computer apparatus unit providing an operating control signal at the output terminal (16) for propagation of the operating control signal to the controlled operating element (12) for controlling the operating element to carry out a predetermined operation, and wherein, additionally, the output terminal (16) of the computer apparatus unit is subject to disturbance signals which, if propagated to the operating element, cause undesired operation of the element (12), comrising, in accordance with the invention:

an evaluation stage or circuit (18) coupled to the output terminal (16) of the computer apparatus unit (10), said evaluation stage or circuit including means (20) for providing test or check signals;

a comparator (22) receiving signal samples from the output terminal (16) of the computer apparatus unit and said test or check signals and effecting comparison;

and a control signal source (24) coupled to receive the output from the comparator (22) and responding to the comparator output indicative of (a) coincidence of the signal samples and the test or check signals, (b) a deviation between the signal samples and the test or check signals;

said control signal source providing control signals of differing characteristics in dependence on the output from the comparator (22) in accordance with the comparison therein;

a time delay stage (30) coupled between the output terminal (16) of the computer apparatus unit (10) and an input terminal (28) of the operating element (12);

a correction terminal (34) on the computer apparatus unit (10) and controlling the computer apparatus unit to repeat at leat one of: a computation; a computation cycle; a computation step;

and coupling means (32) connected to receive the control signals from the control signal source and connected to the correction terminal (34) of the computer apparatus unit (10) to cause the computer apparatus unit to correct its computation if a deviation has been detected and for providing output signals inhibiting transmission of the operating control signal from the computer apparatus unit (10) through the time delay stage (30) to the operating element (12) if such a deviation has been detected by the comparator.

20. The system of claim 19, wherein the time delay stage (30) comprises a read-write memory;

and the control signal source (24) includes a connection connected to a "release" input (36) and a "reset" input (38) of the write-read memory (30), for, respectively, either releasing transmission of the operating signal from the computer apparatus unit (10) to the operating element (12) if the comparison condition (a) is met, or to reset the read-write memory (30) if the comparison condition (b) is met.

21. The system of claim 19, wherein the time delay stage (30) comprises a shift register;

and wherein the output of the control signal source (24) is connected to a reset input (36) of the shift register for resetting the shift register if the comparison condition (b) is detected by the comparator (22).

22. The system according to claim 19, wherein the time delay stage (30) comprises a delay line, and the output of the control signal source (24) is connected to a reset input (38) of the delay line to reset the delay line if the coparison condition (b) is detected in the comparator (22).

23. The system according to claim 19, wherein the time delay stage (30) comprises a reference signal source (50), an integrator (52) and a comparator element (54) coupled to receive the operating control signal from the computer apparatus unit (10) and a reference signal from the reference signal source (50);

and wherein the evaluation stage or circuit controls the correction terminal (34) of the computer apparatus unit (10) to inhibit transmission of a control signal therefrom to the integrator if the comparison condition (b) is determined by the comparator (22).

* * * * *